(12) United States Patent
Yap et al.

(10) Patent No.: US 9,251,374 B2
(45) Date of Patent: Feb. 2, 2016

(54) INSTRUCTIONS TO PERFORM JH CRYPTOGRAPHIC HASHING

(75) Inventors: Kirk S. Yap, Framingham, MA (US); Gilbert M. Wolrich, Framingham, MA (US); Vinodh Gopal, Westborough, MA (US); James D. Guilford, Northborough, MA (US); Erdinc Ozturk, Marlborough, MA (US); Sean M. Gulley, Boston, MA (US); Wajdi K. Feghali, Boston, MA (US); Martin G. Dixon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 13/992,225

(22) PCT Filed: Dec. 22, 2011

(86) PCT No.: PCT/US2011/066733
§ 371 (c)(1),
(2), (4) Date: Jun. 6, 2013

(87) PCT Pub. No.: WO2013/095484
PCT Pub. Date: Jun. 27, 2013

(65) Prior Publication Data
US 2014/0053000 A1    Feb. 20, 2014

(51) Int. Cl.
*G06F 21/00* (2013.01)
*G06F 21/64* (2013.01)
*H04L 9/06* (2006.01)

(52) U.S. Cl.
CPC .............. *G06F 21/64* (2013.01); *H04L 9/0643* (2013.01); *H04L 2209/12* (2013.01)

(58) Field of Classification Search
CPC .... H04L 9/0643; H04L 2209/12; G06F 21/64
See application file for complete search history.

(56) References Cited

U.S. PATENT DOCUMENTS

| | | | |
|---|---|---|---|
| 7,043,016 B2 | 5/2006 | Roelse | |
| 8,036,379 B2 | 10/2011 | Ferguson et al. | |
| 8,675,865 B2 * | 3/2014 | Graunke | 380/28 |
| 8,929,539 B2 * | 1/2015 | Wolrich et al. | 380/28 |
| 2008/0148063 A1 * | 6/2008 | Hanko et al. | 713/189 |
| 2010/0250497 A1 * | 9/2010 | Redlich et al. | 707/661 |
| 2012/0254591 A1 * | 10/2012 | Hughes et al. | 712/205 |
| 2014/0205084 A1 * | 7/2014 | Wolrich et al. | 380/28 |

FOREIGN PATENT DOCUMENTS

| | | |
|---|---|---|
| TW | I322613 B | 3/2010 |
| TW | I323613 B | 4/2010 |
| TW | I332785 B | 11/2010 |

OTHER PUBLICATIONS

PCT International Search Report for PCT Counterpart Application No. PCT/US2011/066733, 3 pgs., (Sep. 21, 2012).

(Continued)

*Primary Examiner* — Mohammad A Siddiqi
(74) *Attorney, Agent, or Firm* — Nicholson De Vos Webster & Elliott LLP

(57) ABSTRACT

A method is described. The method includes executing one or more JH_SBOX_L instruction to perform S-Box mappings and a linear (L) transformation on a JH state and executing one or more JH_Permute instruction to perform a permutation function on the JH state once the S-Box mappings and the L transformation have been performed.

19 Claims, 15 Drawing Sheets

(56) References Cited

OTHER PUBLICATIONS

PCT Written Opinion of the International Searching Authority for PCT Counterpart Application No. PCT/US2011/066733, 5 pgs., (Sep. 21, 2012).
PCT Notification concerning Transmittal of International Preliminary Report on Patentability (Chapter I of the Patent Cooperation Treaty) for PCT Counterpart Application No. PCT/US2011/066733, 7 pgs., (Jul. 3, 2014).
Namin, A.H., et al., FPGA Implementation of CubeHash, Grøstel, JH, and SHAvite-3 Hash Functions, Department of Electrical and Computer Engineering, University of Waterloo, Apr. 2010, Waterloo, Ontario, CA.
Wu, H., "The Hash Function JH" Submission to NIST, http://ehash.iaik.1ugraz.at/uploads/1/1d/Jh20090915.pdf, Institute for Infocomm Research, Sep. 15, 2009, Singapore.
Intel Corporation, "Intel 64 and IA-32 Architectures, Software Developer's Manual, Instruction Set Reference, A-Z", Jun. 2014, 1493 pgs., vol. 2 (2A, 2B & 2C).
Wu, H., "The Hash Function JH" http://www3.ntu.edu.sg/home/wuhj/research/jh/jh_round3.pdf Institute for Infocomm Research, Jan. 16, 2011, Singapore.
PCT/US2011/066719 Written Opinion of the International Searching Authority, mailed Aug. 28, 2013, 7 pages.
PCT/US2011/066719 International Search Report, mailed Aug. 28, 2013, 6 pages.
PCT/US2011/066719 International Preliminary Report on Patentability, mailed Jul. 3, 2014, 9 pages.
Office action and Search Report with summarized English translation from Taiwan Patent Application No. 101143929, mailed Oct. 28, 2014, 17 pages.
Provelengios, G., et al. "Low Power FPGA Implementations of JH and Fugue Hash Functions", Digital System Design (DSD), 14th Euromicro Conference, Aug. 31-Sep. 2, 2011, pp. 417-421, Oulu, Finland.
Murvay, P.S., et al., "Performance Improvements for SHA-3 Finalists by Exploiting Microcontroller On-Chip Parallelism", Risk and Security of Internet and Systems (CRiSIS), 2011 6th International Conference, Sep. 26-28, 2011, pp. 1-7, Timisoara, Romania.
Guo, X., et al., "Pre-Silicon Characterization of NIST SHA-3 Final Round Candidates", Digital System Design (DSD), 14th Euromicro Conference, Aug. 31-Sep. 2, 2011, pp. 535-542, Oulu, Finland.
Namin, A.H., et al., "FPGA Implementation of CubeHash, Grostel, JH, and SHAvite-3 Hash Functions", NEWCAS Conference (NEWCAS) 8th IEEE International, Jun. 20-23, 2010 pp. 121-124, Montreal Quebec.
Zhang, R., et al., "A Block Cipher using Key-Dependent S-box and P-boxes", Industrial Electronics, ISIE, 2008, IEEE International Symposium, Jun. 30-Jul. 2, 2008, p. 1463-1468, Cambridge, MA.
Office action with summarized English translation for Taiwan Patent Application No. 101143929, mailed Jul. 16, 2015, 6 pages.
Office Action and Search Report with English translation from Taiwan Patent Application No. 101146621, mailed Jan. 28, 2015, 7 pages.
Office Action from U.S. Appl. No. 13/995,457, mailed May 7, 2015, 18 pages.

* cited by examiner

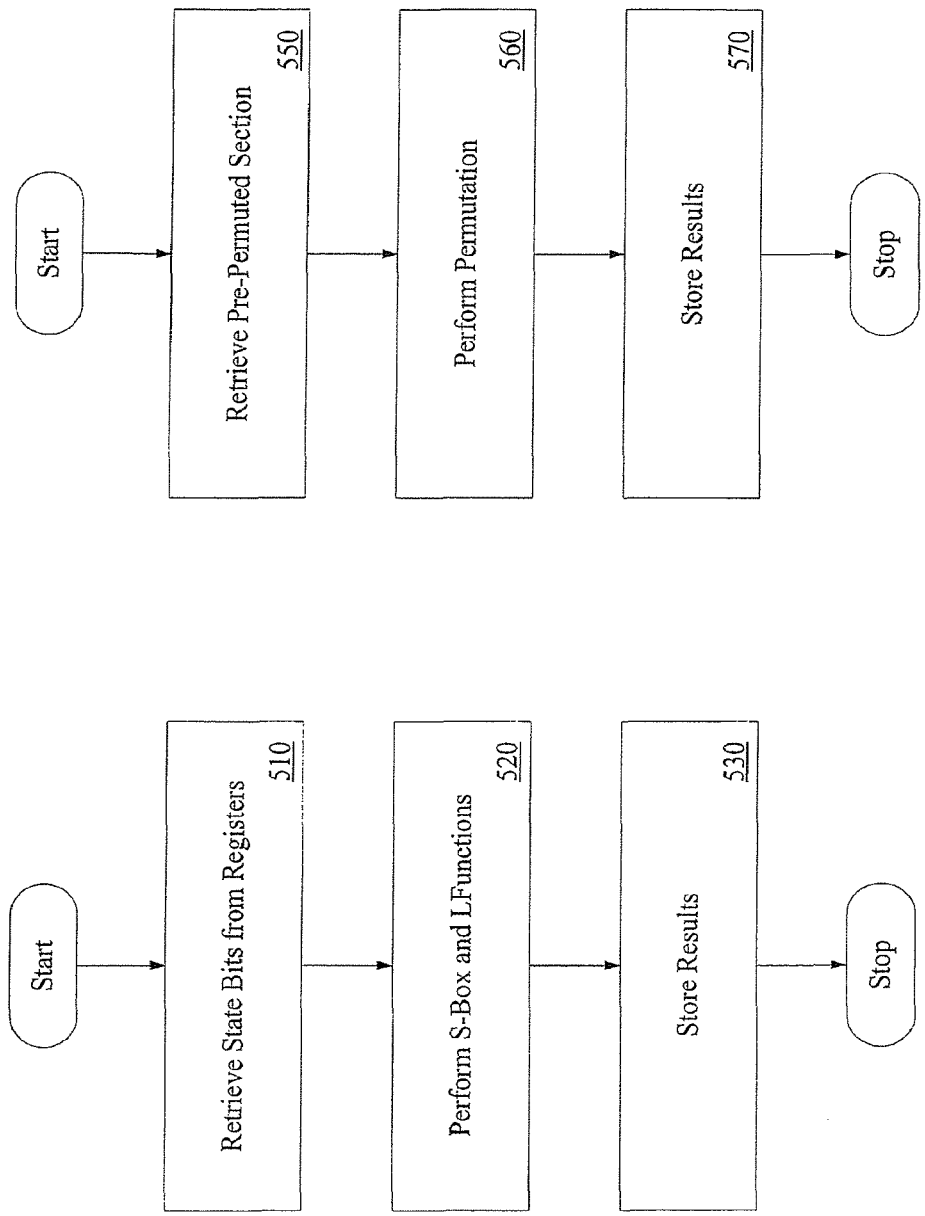

INSTRUCTIONS TO PERFORM JH CRYPTOGRAPHIC HASHING

CROSS-REFERENCE TO RELATED APPLICATIONS

This patent application is a U.S. National Phase Application under 35 U.S.C. §371 of International Application No. PCT/US2011/066733, filed Dec. 22, 2011, entitled INSTRUCTIONS TO PERFORM JH CRYPTOGRAPHIC HASHING.

FIELD OF THE INVENTION

This disclosure relates to cryptographic algorithms and in particular to the JH Hashing algorithm.

BACKGROUND

Cryptology is a tool that relies on an algorithm and a key to protect information. The algorithm is a complex mathematical algorithm and the key is a string of bits. There are two basic types of cryptology systems: secret key systems and public key systems. A secret key system also referred to as a symmetric system has a single key ("secret key") that is shared by two or more parties. The single key is used to both encrypt and decrypt information.

The JH hash function (JH) is a cryptographic function that has been submitted for the National Institute of Standards and Technology (NIST) hash function competition to develop a new SHA-3 function to replace the older SHA-1 and SHA-2. JH is based on an algorithm that includes four variants (JH-224, JH-256, JH-384 and JH-512), which produce different sized digests. However, each variant of JH implements the same compression function.

Currently, JH may be executed in a general purpose processor using instructions in either Streaming SIMD Extensions (SSE) or Advanced Vector Extensions (AVX). Nonetheless, such applications may require the execution of up to 30 instructions to perform the JH algorithm.

BRIEF DESCRIPTION OF THE DRAWINGS

A better understanding of the present invention can be obtained from the following detailed description in conjunction with the following drawings, in which:

FIG. 5 is a flow diagram illustrating one embodiment of processes preformed by an instruction;

FIG. 6 is a flow diagram illustrating one embodiment of processes preformed by an instruction;

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A mechanism including instructions to process the JH Hashing algorithm is described. According to one embodiment, the JH Hashing algorithm is implemented via instructions in the AVX instruction set. The AVX instruction set is an extension to the x86 instruction set architecture (ISA), which increases the register file from 128 bits.

Figure 1:
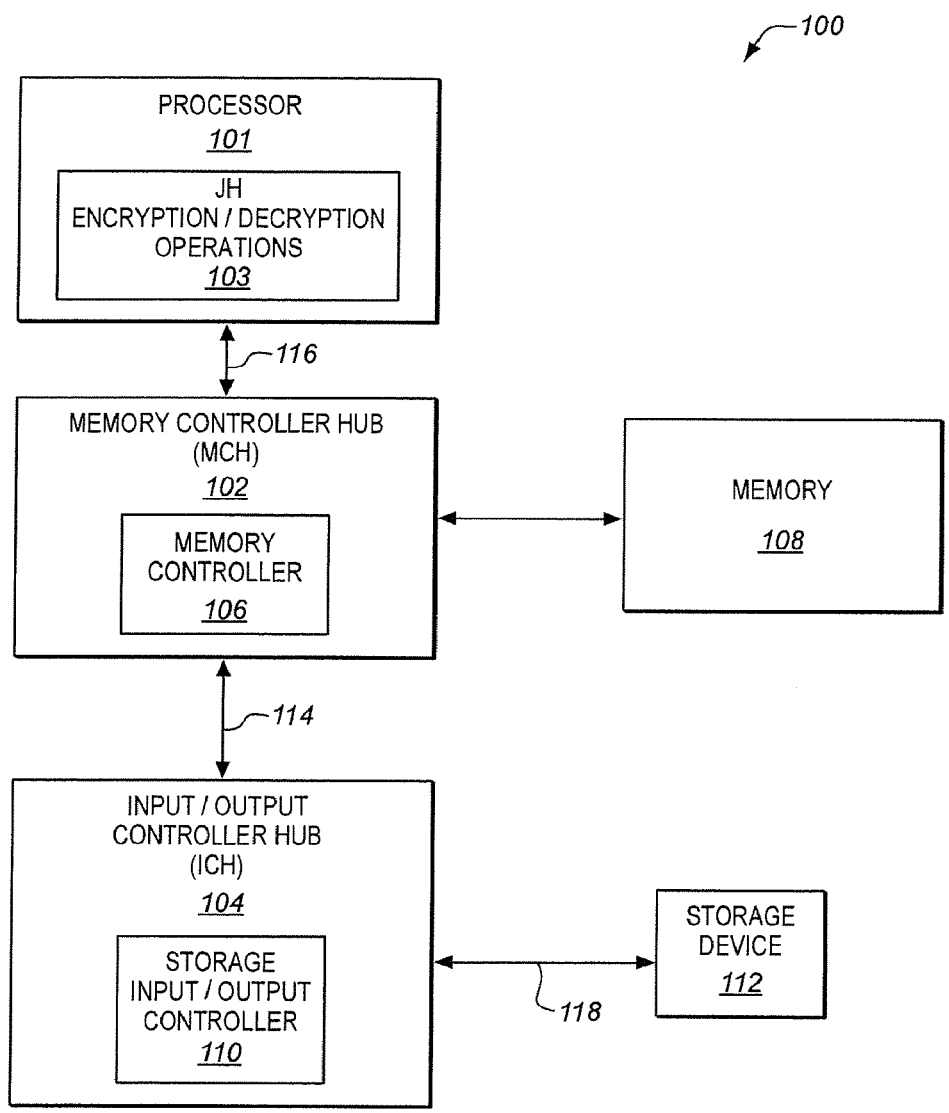
FIG. 1 is a block diagram illustrating one embodiment of a system.

FIG. 1 is a block diagram of one embodiment of a system 100 that includes an AVX instruction set extension for performing JH encryption and decryption in a general purpose processor.

The system 100 includes a processor 101, a Memory Controller Hub (MCH) 102 and an Input/Output (I/O) Controller Hub (ICH) 104. MCH 102 includes a memory controller 106 that controls communication between the processor 101 and memory 108. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, Intel® Core® i3, i5, i7, 2 Duo and Quad, Xeon®, Itanium® processor, or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 110 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

In one embodiment, processor 101 includes a JH function 103 to perform JH encryption and decryption operations. The JH function 103 may be used to encrypt or decrypt information stored in memory 108 and/or stored in the storage device 112.

Figure 2:
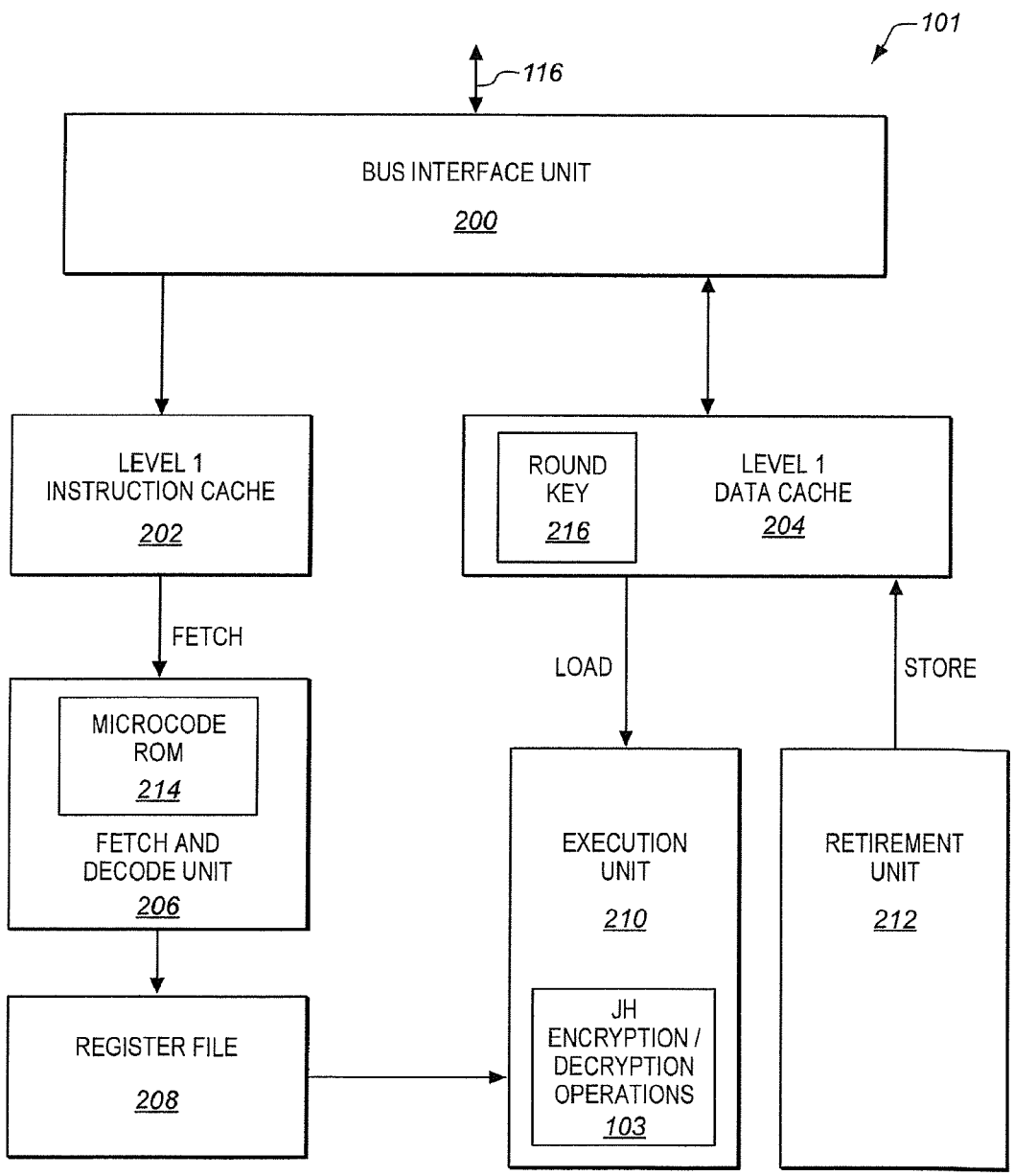
FIG. 2 is a block diagram illustrating one embodiment of a processor.

FIG. 2 is a block diagram illustrating one embodiment of processor 101. Processor 101 includes a fetch and decode unit 202 for decoding processor instructions received from Level 1 (L1) instruction cache 202. Data to be used for executing the instruction may be stored in register file 208. In one embodiment, the register file 208 includes a plurality of registers that are used by an AVX instruction to store data for use by the AVX instruction.

Figure 3:
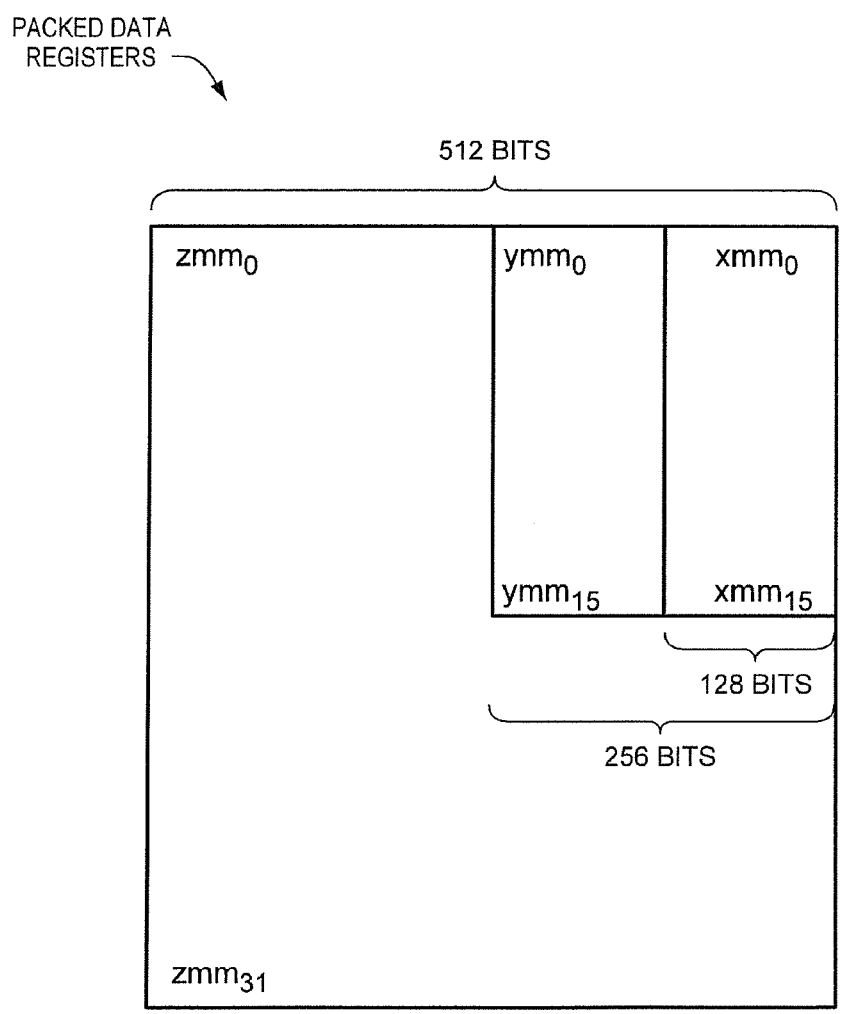
FIG. 3 is a block diagram illustrating one embodiment of packed data registers.

FIG. 3 is a block diagram of an example embodiment of a suitable set of packed data registers in register file 208. The illustrated packed data registers include thirty-two 512-bit packed data or vector registers. These thirty-two 512-bit registers are labeled ZMM0 through ZMM31. In the illustrated embodiment, the lower order 256-bits of the lower sixteen of these registers, namely ZMM0-ZMM15, are aliased or overlaid on respective 256-bit packed data or vector registers labeled YMM0-YMM15, although this is not required.

Likewise, in the illustrated embodiment, the lower order 128-bits of YMM0-YMM15 are aliased or overlaid on respective 128-bit packed data or vector registers labeled XMM0-XMM1, although this also is not required. The 512-bit registers ZMM0 through ZMM31 are operable to hold 512-bit packed data, 256-bit packed data, or 128-bit packed data.

The 256-bit registers YMM0-YMM15 are operable to hold 256-bit packed data, or 128-bit packed data. The 128-bit registers XMM0-XMM1 are operable to hold 128-bit packed data. Each of the registers may be used to store either packed floating-point data or packed integer data. Different data element sizes are supported including at least 8-bit byte data, 16-bit word data, 32-bit doubleword or single precision floating point data, and 64-bit quadword or double precision floating point data. Alternate embodiments of packed data registers may include different numbers of registers, different sizes of registers, and may or may not alias larger registers on smaller registers.

Referring back to FIG. 2, the fetch and decode unit 202 fetches macroinstructions from L1 instruction cache 202, decodes the macroinstructions and breaks them into simple operations called micro operations (pops). The execution unit 210 schedules and executes the micro operations. In the embodiment shown, the JH function 103 in execution unit 210 includes micro operations for the AVX instruction. The retirement unit 212 writes the results of the executed instructions to registers or memory.

JH function 103 performs a compression function including three functions that are run for 42 rounds. The first function is the S-Box function, which includes the implementation of one of two transforms ($S_0$ and $S_1$) to transform adjacent 4-bit nibbles. Table 1 illustrates one embodiment of S-Box transforms $S_0(x)$ and $S_1(x)$.

TABLE 1

| x | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| $S_0(x)$ | 9 | 0 | 4 | 11 | 13 | 12 | 3 | 15 | 1 | 10 | 2 | 6 | 7 | 5 | 8 | 14 |
| $S_1(x)$ | 3 | 12 | 6 | 13 | 5 | 7 | 1 | 9 | 15 | 2 | 0 | 4 | 11 | 10 | 14 | 8 |

The second function is the Linear Transformation (L) that implements a (4, 2, 3) Maximum Distance Separable (MDS) code over $GF(2^4)$, where $GF\ 2^4$ is defined as the multiplication of binary polynomials modulo the irreducible polynomial $X^4+X+1$. The linear transformation is performed on adjacent 8 bit bytes (or two adjacent S-Box outputs). Let A, B, C and D denote 4-bit words, then L transforms (A,B) into (C,D) as $(C,D)=L(A,B)=(5\cdot A+2\cdot B, 2\cdot A+B)$. Thus the function (C,D)=L(A,B) is computed as:

$$D0=B0\oplus A1;\ D1=B1\oplus A2;$$

$$D2=B2\oplus A3\oplus A0;\ D3=B3\oplus A0;$$

$$C0=A0\oplus D1;\ C1=A1\oplus D2;$$

$$C2=A2\oplus D3\oplus D0;\ C3=A3\oplus D0.$$

Figure 4:
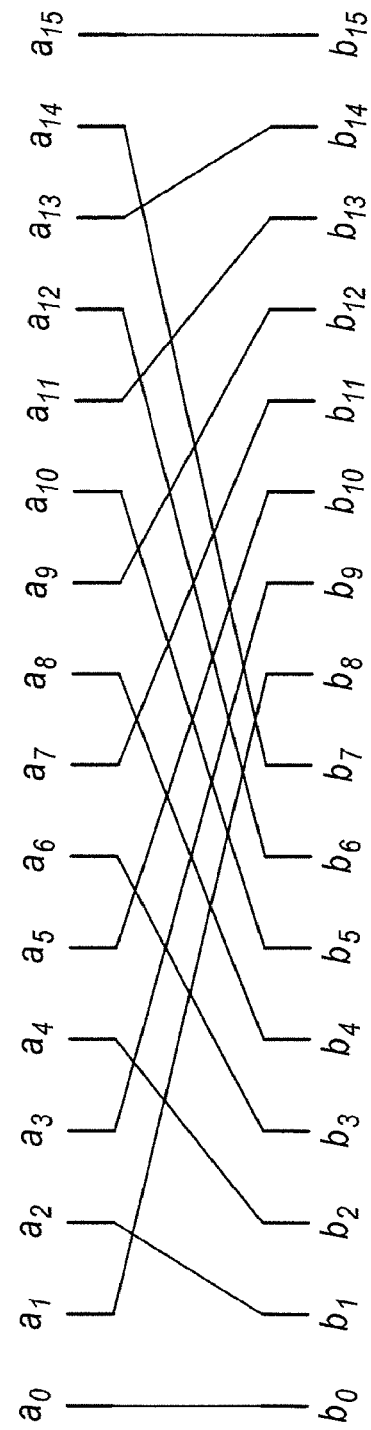
FIG. 4 illustrates one embodiment of a resultant nibble permutation.

The third function is the Permutation function ($P_d$). $P_d$ is a simple permutation on 2d elements, constructed from $\pi_d$ (swap alternating nibbles), $P'_d$ (swap nibbles from low half low half of state and high half of state) and $\phi_d$ (swap nibbles in high half of state). FIG. 4 illustrates on embodiment of a resultant nibble permutation $P_d(\pi_d, P'_d, \phi_d)$ for d=4 in a 64-bit data path, where d is the dimension of a block of bits. In one embodiment, the JH function uses d=8 for a data width of 256 4-bit nibbles (or 1024 bits).

In conventional systems, the JH is "bit sliced", instead of operating on nibbles in bytes. Bit slicing enables bits of the nibbles to be partitioned into separate words. Thus, S-Box nibbles permit all S-Box nibbles to be executed in parallel via SSE/AVX instructions. Further, combining bit slicing with alternating odd and even SBOX registers enables both SBOX and L transform evaluation. Full permutation is not necessary for every round in the bit-slice implementation. Specifically, the appropriate odd S-Box is put into position to operate with the proper even S-Box for the next round. This is done by with 7 swapping permutations which repeat 6 times for the 42 JH rounds.

While the bit slicing approach enables parallel execution of all SBOX calculation and L transforms, 20 instructions are required to perform 23 logic functions of the SBOX logic and 10 instructions are needed (for 2 operand XORs) for the 10 XOR functions comprising the L transform. Such performance can be improved.

According to one embodiment, two new instructions and data paths are defined that operate on 4 bit nibbles and pairs of nibbles to perform the SBOX and L-Transform functions using the 512-bit ZMM registers in register file 208. In such an embodiment, the 1024 bit state is stored in two ZMM registers, with nibbles 0-127 in the first ZMM register and nibbles 128-255 in the second ZMM register.

A new instruction and data path JH_SBOX_L is defined as JH_SBOX_L ZMM, ZMMmask. FIG. 5 is a flow diagram illustrating one embodiment of a process preformed by the JH_SBOX_L instruction. As discussed above, the 1024 state bits are organized consecutively as represented in the JH specification from 0 to 1023 in two ZMM registers.

At processing block 510, a 512-bit section representing ½ of the state bits is retrieved from a ZMM register. At processing block 520, the S-Box and L transforms are performed on the retrieved state bits. In one embodiment, the S-Box function is performed using mask information from ZMMMask. In one embodiment, the ZMMMASK represents the constants from the JH specification (A.2 Round constants in the bit-slice implementation of E8. Using ZMM, 256 bits can be derived by interleaving odd and even bits for each round.

Upon completion of the S-Box operations, the L transform operations are performed on each 8-bit nibble pair. At processing block 530, the 512-bit results of the transforms are stored in a destination register. The JH_SBOX_L instruction is executed twice (for lower 512 bits then for the upper 512 bits) to complete a round of S-Box and L transforms for the full JH state.

A JH_Permute instruction and data path are implemented to perform the Permutation step $P_d$ for each of the ZMM registers that hold the result of the of S-Box and L transforms. In one embodiment, a JH_Permute instruction is implemented to perform the defined as JH_ Permute ZMM1, ZMM2, imm8, where ZMM1 stores the lower pre-permuted 128 nibbles (e.g., 512 bits), ZMM2 stores the upper pre-permuted 128 nibbles and imm8=0/1 specifies the lower/upper nibbles.

Figure 7:
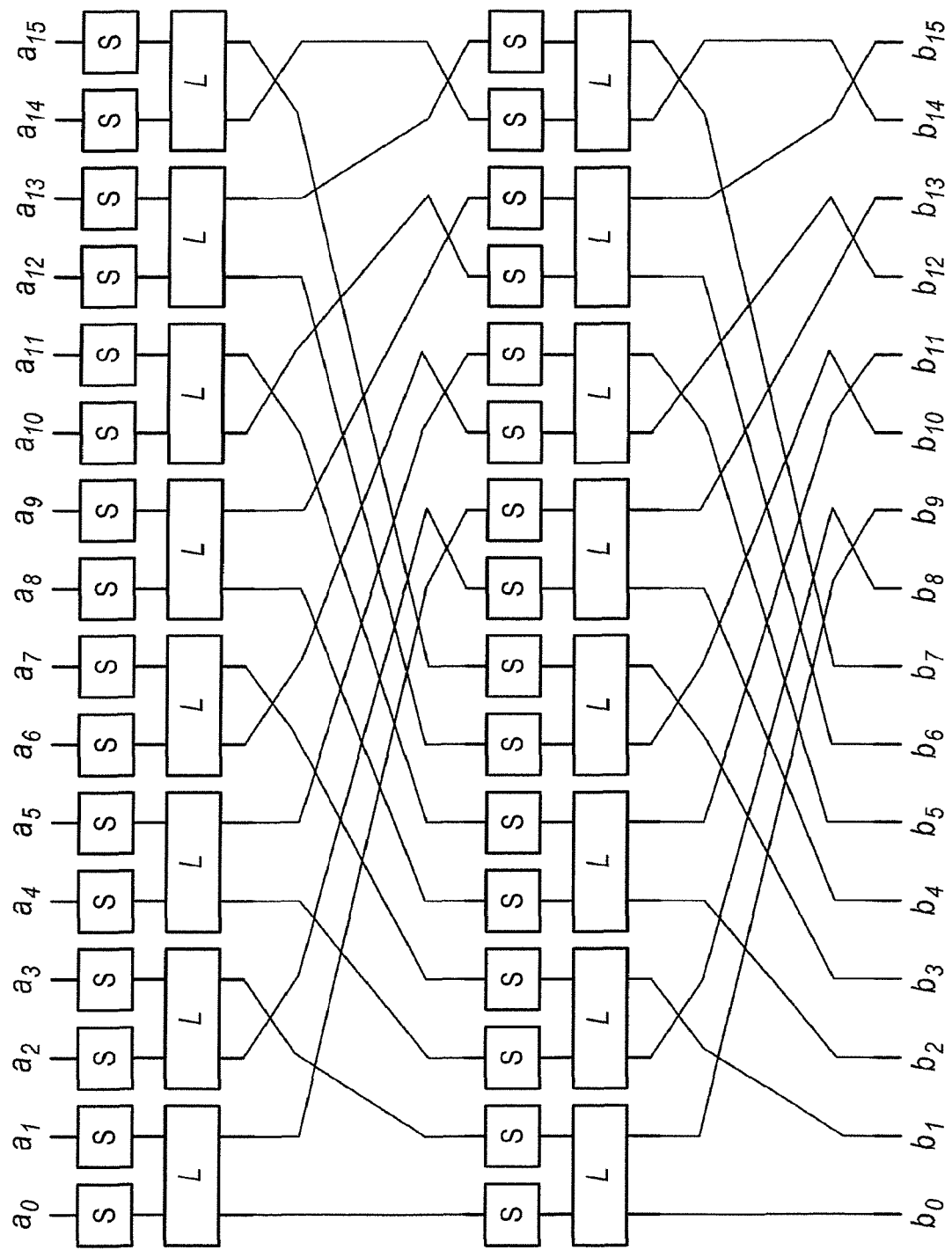
FIG. 7 illustrates an embodiment of two rounds of JH using instructions.

FIG. 6 is a flow diagram illustrating one embodiment of a process preformed by the JH_Permute instruction. At processing block 550, a pre-permuted ½ section of the JH state is retrieved from a ZMM register indicated by imm8. At processing block 560, the permutation process is performed for the retrieved bits. At processing block 570, the results of the permutation are stored. The JH_Permute instruction is executed twice to complete a round of permutations. FIG. 7 illustrates two of 42 rounds of JH using the above-described instructions.

The above-described JH instructions implement a three cycle pipeline data path. Thus, a round of JH (e.g., two executions of each of the JH_SBOX_L and JH_Permute instructions) is completed in eight cycles. This results in a 2-3× performance improvement over the bit-sliced approach.

Figure 8:
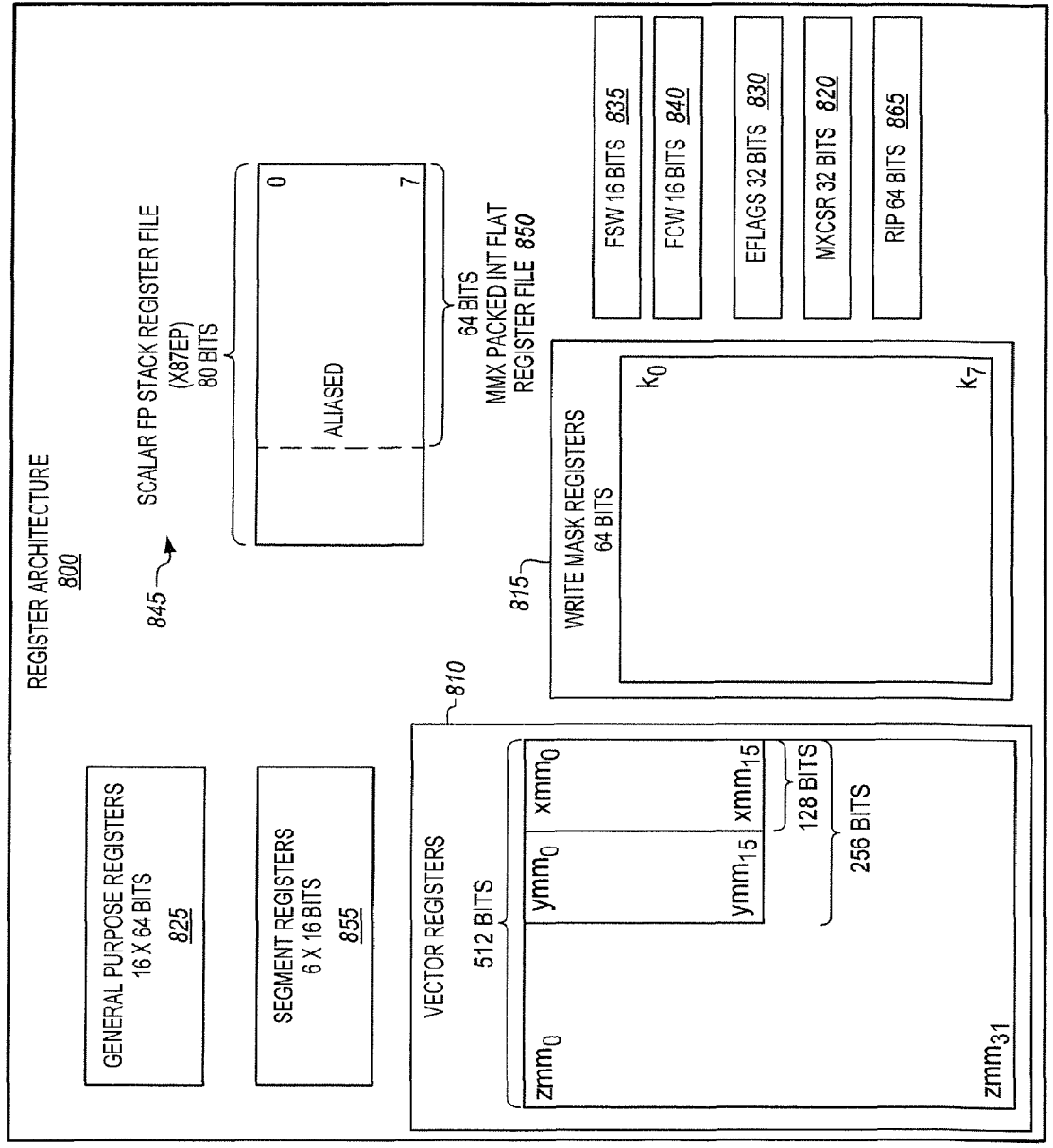
FIG. 8 is a block diagram of a register architecture according to one embodiment of the invention.

Exemplary Register Architecture—FIG. 8

FIG. 8 is a block diagram illustrating a register architecture 800 according to one embodiment of the invention. The register files and registers of the register architecture are listed below:

Vector register file 810—in the embodiment illustrated, there are 32 vector registers that are 512 bits wide; these registers are referenced as zmm0 through zmm31. The lower order 856 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 815—in the embodiment illustrated, there are 8 write mask registers (k0 through k7), each 64 bits in size. In one embodiment of the invention the vector mask register k0 cannot be used as a write mask; when the encoding that would normally indicate k0 is used for a write mask, it selects a hardwired write mask of 0xFFFF, effectively disabling write masking for that instruction.

Multimedia Extensions Control Status Register (MXCSR) 1020—in the embodiment illustrated, this 32-bit register provides status and control bits used in floating-point operations.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Extended flags (EFLAGS) register 830—in the embodiment illustrated, this 32 bit register is used to record the results of many instructions.

Floating Point Control Word (FCW) register 835 and Floating Point Status Word (FSW) register 840—in the embodiment illustrated, these registers are used by x87 instruction set extensions to set rounding modes, exception masks and flags in the case of the FCW, and to keep track of exceptions in the case of the FSW.

Scalar floating point stack register file (x87 stack) 845 on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Segment registers 855—in the illustrated embodiment, there are six 16 bit registers use to store data used for segmented address generation.

RIP register 865—in the illustrated embodiment, this 64 bit register that stores the instruction pointer.

Alternative embodiments of the invention may use wider or narrower registers. Additionally, alternative embodiments of the invention may use more, less, or different register files and registers.

Exemplary In-Order Processor Architecture—FIGS. 6A-6B

FIGS. 9A-B illustrate a block diagram of an exemplary in-order processor architecture. These exemplary embodiments are designed around multiple instantiations of an in-order CPU core that is augmented with a wide vector processor (VPU). Cores communicate through a high-bandwidth interconnect network with some fixed function logic, memory I/O interfaces, and other necessary I/O logic, depending on the application. For example, an implementation of this embodiment as a stand-alone GPU would typically include a PCIe bus.

FIG. 9A is a block diagram of a single CPU core, along with its connection to the on-die interconnect network 902 and with its local subset of the level 2 (L2) cache 904, according to embodiments of the invention. An instruction decoder 900 supports the x86 instruction set with an extension. While in one embodiment of the invention (to simplify the design) a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The L1 cache 906 allows low-latency accesses to cache memory into the scalar and vector units. Together with load-op instructions in the vector friendly instruction format, this means that the L1 cache 906 can be treated somewhat like an extended register file. This significantly improves the performance of many algorithms.

The local subset of the L2 cache 904 is part of a global L2 cache that is divided into separate local subsets, one per CPU core. Each CPU has a direct access path to its own local subset of the L2 cache 904. Data read by a CPU core is stored in its L2 cache subset 904 and can be accessed quickly, in parallel with other CPUs accessing their own local L2 cache subsets. Data written by a CPU core is stored in its own L2 cache subset 904 and is flushed from other subsets, if necessary. The ring network ensures coherency for shared data.

FIG. 9B is an exploded view of part of the CPU core in FIG. 9A according to embodiments of the invention. FIG. 9B includes an L1 data cache 906A part of the L1 cache 904, as well as more detail regarding the vector unit 910 and the vector registers 1114. Specifically, the vector unit 910 is a 16-wide vector processing unit (VPU) (see the 16-wide ALU 928), which executes integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating the resulting vector writes.

Register data can be swizzled in a variety of ways, e.g. to support matrix multiplication. Data from memory can be replicated across the VPU lanes. This is a common operation in both graphics and non-graphics parallel data processing, which significantly increases the cache efficiency.

The ring network is bi-directional to allow agents such as CPU cores, L2 caches and other logic blocks to communicate with each other within the chip. Each ring data-path is 1012-bits wide per direction.

Exemplary Out-of-Order Architecture—FIG. 7

Figure 10:
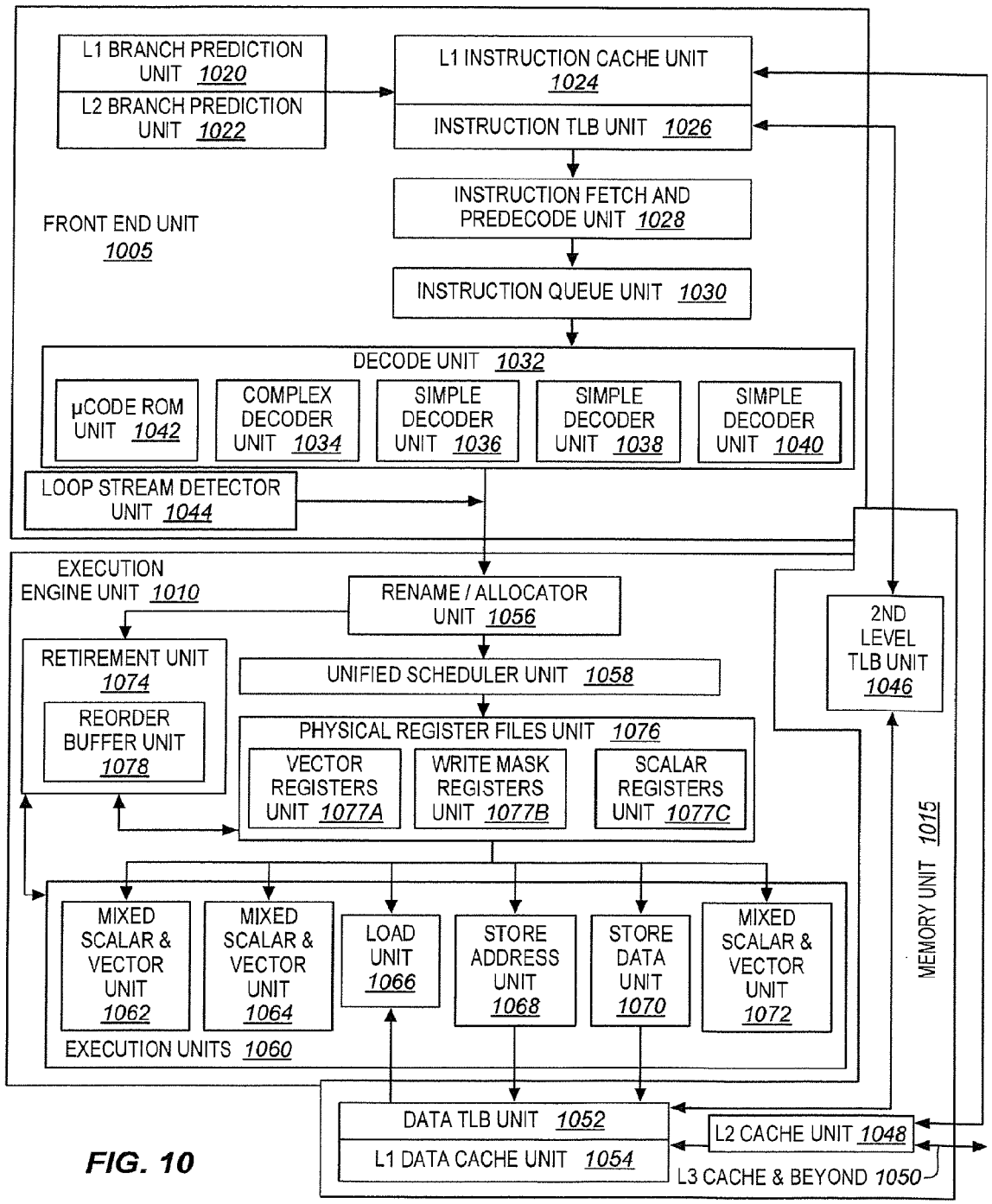
FIG. 10 is a block diagram illustrating an exemplary out-of-order architecture according to embodiments of the invention.

FIG. 10 is a block diagram illustrating an exemplary out-of-order architecture according to embodiments of the invention. Specifically, FIG. 10 illustrates a well-known exemplary out-of-order architecture that has been modified to incorporate the vector friendly instruction format and execution thereof. In FIG. 10 arrows denote a coupling between two or more units and the direction of the arrow indicates a direction of data flow between those units. FIG. 10 includes a front end unit 1005 coupled to an execution engine unit 1010 and a memory unit 1015; the execution engine unit 1010 is further coupled to the memory unit 1015.

The front end unit 1005 includes a level 1 (L1) branch prediction unit 1020 coupled to a level 2 (L2) branch prediction unit 1022. The L1 and L2 brand prediction units 1020 and 1022 are coupled to an L1 instruction cache unit 1024. The L1 instruction cache unit 1024 is coupled to an instruction translation lookaside buffer (TLB) 1026 which is further coupled to an instruction fetch and predecode unit 1028. The instruction fetch and predecode unit 1028 is coupled to an instruction queue unit 1030 which is further coupled a decode unit 1032. The decode unit 1032 comprises a complex decoder unit 1034 and three simple decoder units 1036, 1038, and 1040. The decode unit 1032 includes a micro-code ROM unit 1042. The decode unit 7 may operate as previously described above in the decode stage section. The L1 instruction cache unit 1024 is further coupled to an L2 cache unit 1048 in the memory unit 1015. The instruction TLB unit 1026 is further coupled to a second level TLB unit 1046 in the memory unit 1015. The decode unit 1032, the micro-code ROM unit 1042, and a loop stream detector unit 1044 are each coupled to a rename/allocator unit 1056 in the execution engine unit 1010.

The execution engine unit 1010 includes the rename/allocator unit 1056 that is coupled to a retirement unit 1074 and a unified scheduler unit 1058. The retirement unit 1074 is further coupled to execution units 1060 and includes a reorder buffer unit 1078. The unified scheduler unit 1058 is further coupled to a physical register files unit 1076 which is coupled to the execution units 1060. The physical register files unit 1076 comprises a vector registers unit 1077A, a write mask registers unit 1077B, and a scalar registers unit 1077C; these register units may provide the vector registers 510, the vector mask registers 515, and the general purpose registers 825; and the physical register files unit 1076 may include additional register files not shown (e.g., the scalar floating point stack register file 845 aliased on the MMX packed integer flat register file 850). The execution units 1060 include three mixed scalar and vector units 1062, 1064, and 1072; a load unit 1066; a store address unit 1068; a store data unit 1070. The load unit 1066, the store address unit 1068, and the store data unit 1070 are each coupled further to a data TLB unit 1052 in the memory unit 1015.

The memory unit 1015 includes the second level TLB unit 1046 which is coupled to the data TLB unit 1052. The data TLB unit 1052 is coupled to an L1 data cache unit 1054. The L1 data cache unit 1054 is further coupled to an L2 cache unit 1048. In some embodiments, the L2 cache unit 1048 is further coupled to L3 and higher cache units 1050 inside and/or outside of the memory unit 1015.

By way of example, the exemplary out-of-order architecture may implement the process pipeline 8200 as follows: 1) the instruction fetch and predecode unit 728 perform the fetch and length decoding stages; 2) the decode unit 732 performs the decode stage; 3) the rename/allocator unit 1056 performs the allocation stage and renaming stage; 4) the unified scheduler 1058 performs the schedule stage; 5) the physical register files unit 1076, the reorder buffer unit 1078, and the memory unit 1015 perform the register read/memory read stage; the execution units 1060 perform the execute/data transform stage; 6) the memory unit 1015 and the reorder buffer unit 1078 perform the write back/memory write stage 1960; 7) the retirement unit 1074 performs the ROB read stage; 8) various units may be involved in the exception handling stage; and 9) the retirement unit 1074 and the physical register files unit 1076 perform the commit stage.

Figure 9:
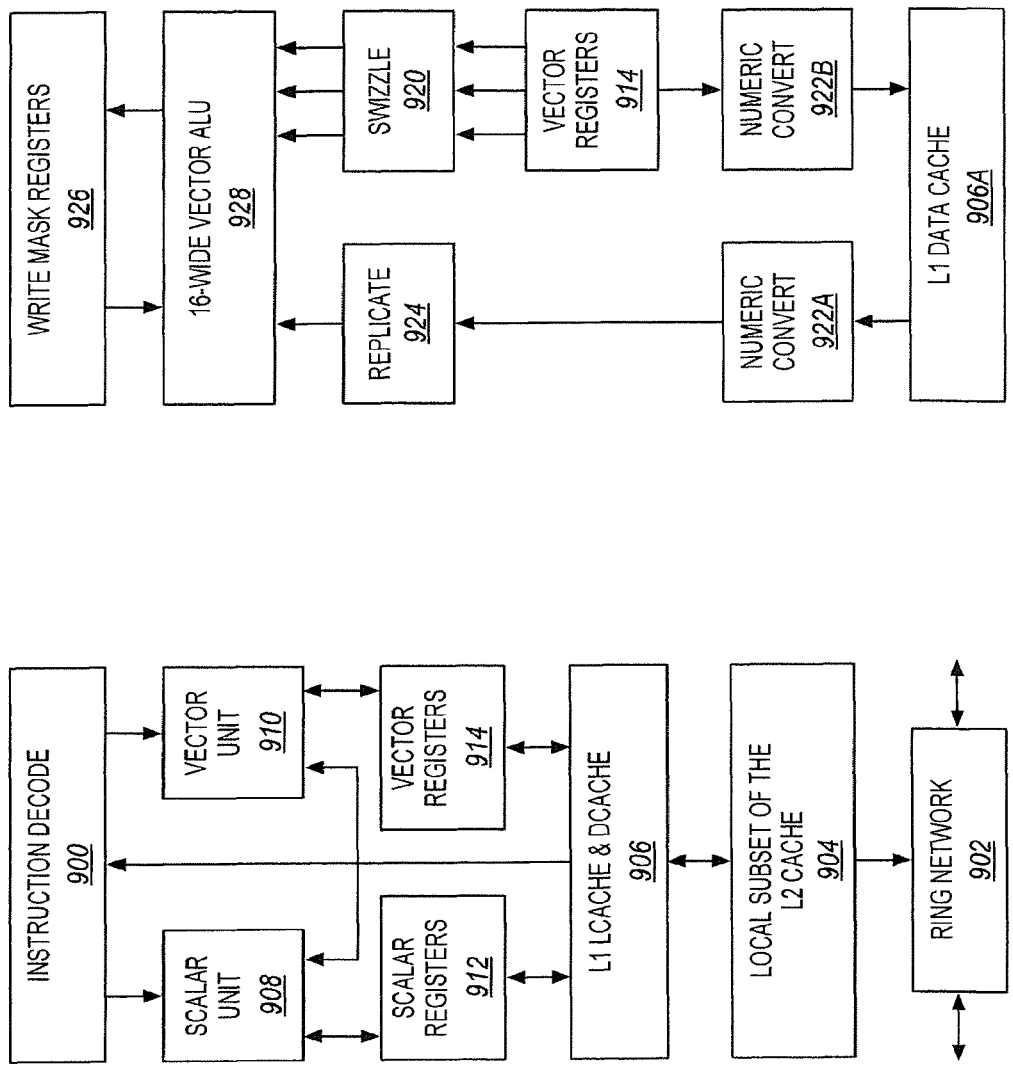
FIG. 9A is a block diagram of a single CPU core, along with its connection to the on-die interconnect network and with its local subset of the level 2 (L2) cache, according to embodiments of the invention.
FIG. 9B is an exploded view of part of the CPU core according to embodiments of the invention.

Exemplary Computer Systems and Processors—FIGS. 8-10

Figure 11:
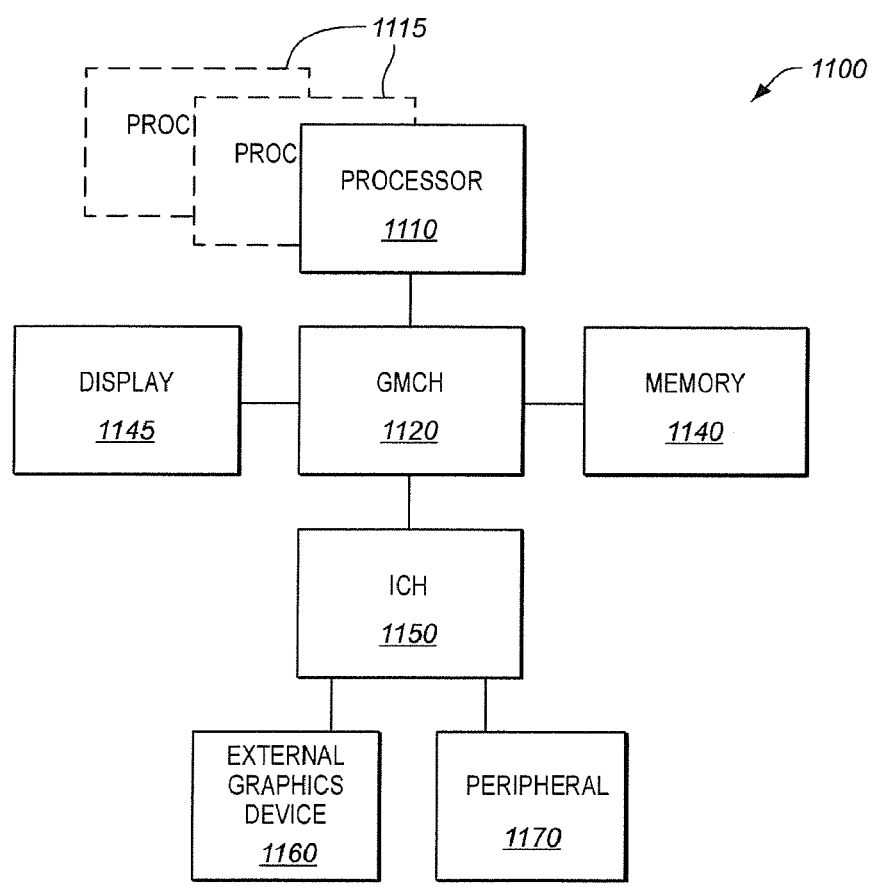
FIG. 11 is a block diagram of a system in accordance with one embodiment of the invention.
Figure 12:
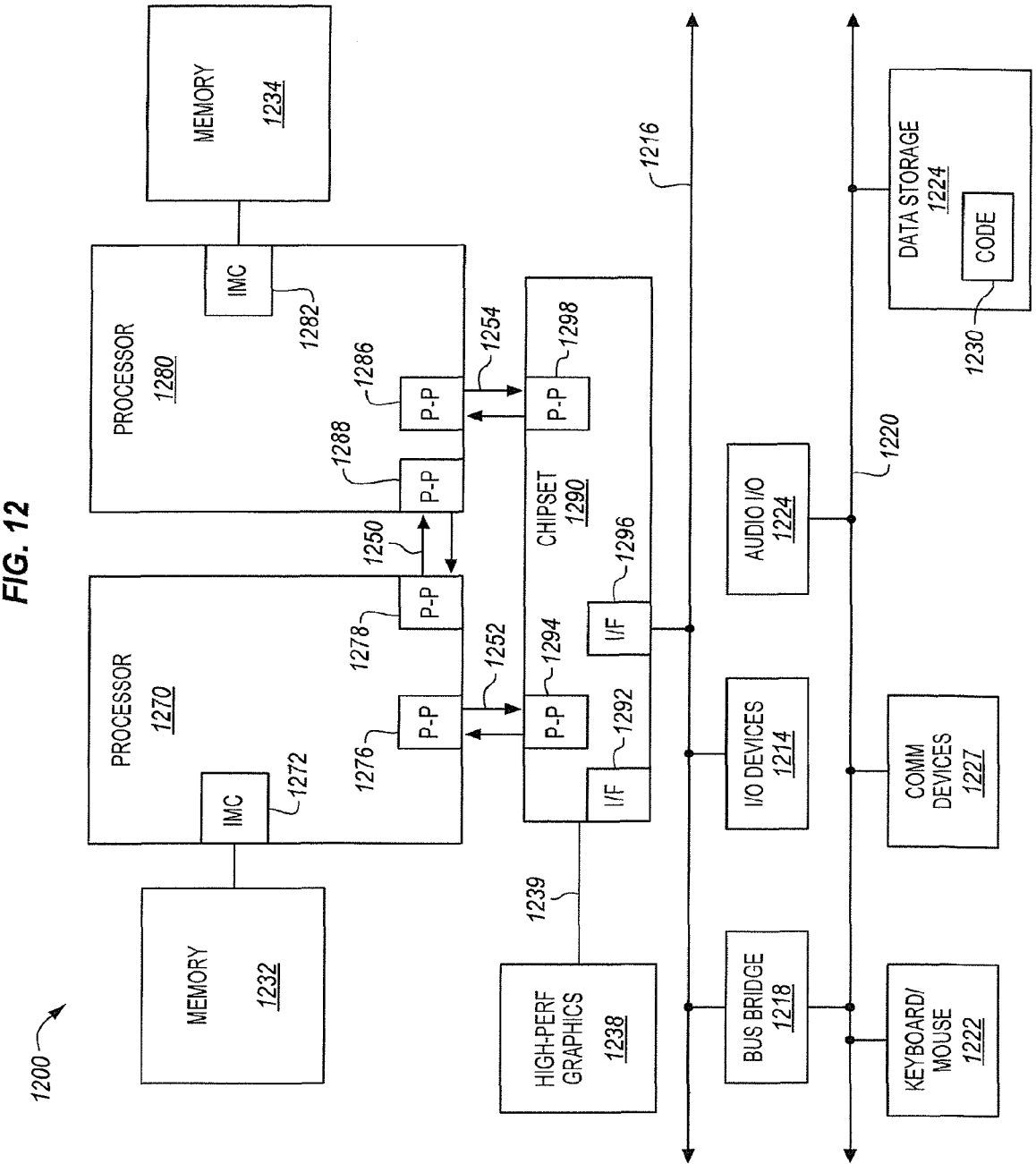
FIG. 12 is a block diagram of a second system in accordance with an embodiment of the invention.
Figure 13:
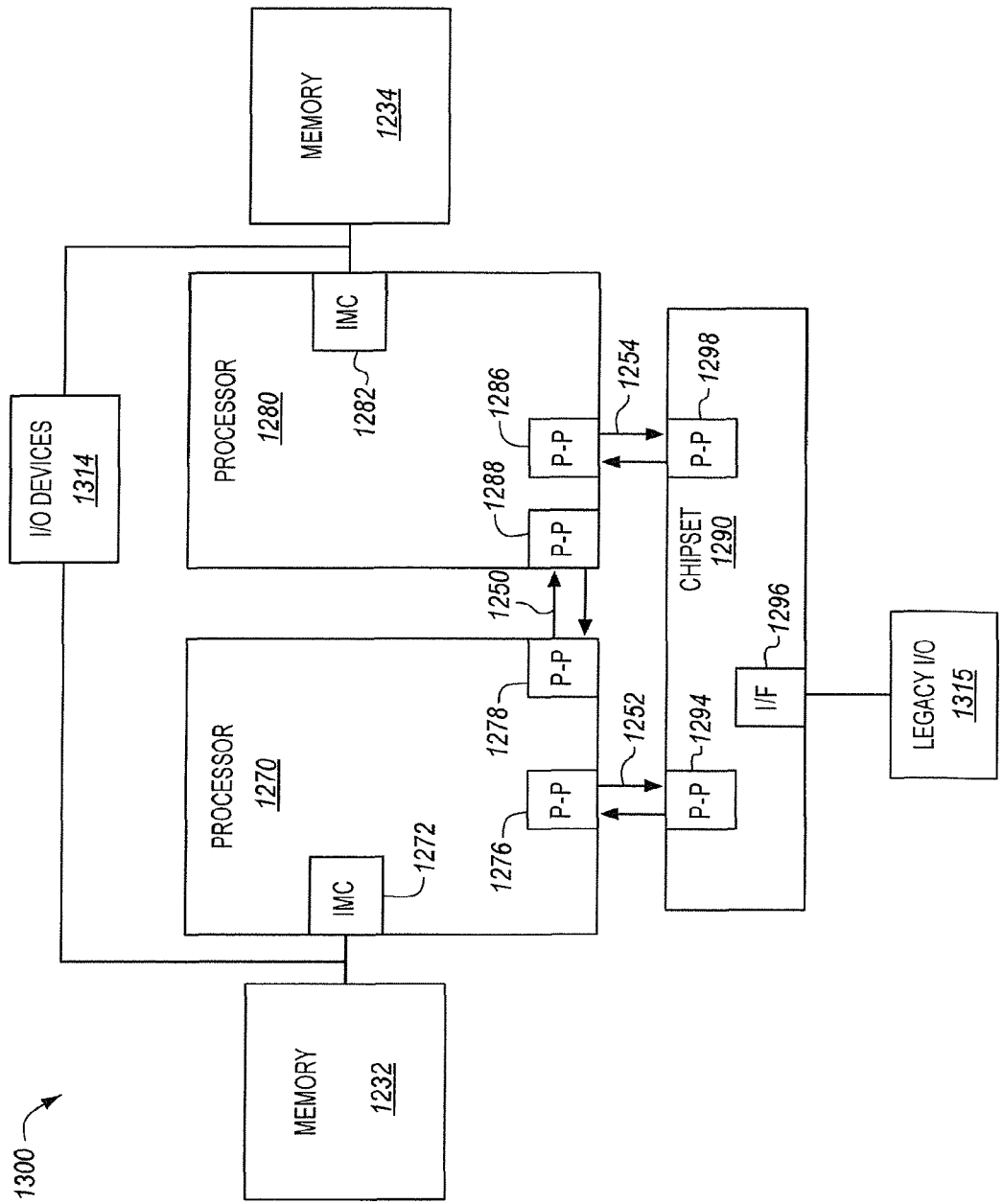
FIG. 13 is a block diagram of a third system in accordance with an embodiment of the invention.

FIGS. 11-13 are exemplary systems suitable for including the processor 101. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 11, shown is a block diagram of a system 1100 in accordance with one embodiment of the invention. The system 1100 may include one or more processors 1110, 1115, which are coupled to graphics memory controller hub (GMCH) 1120. The optional nature of additional processors 1115 is denoted in FIG. 11 with broken lines.

Each processor 1110, 1115 may be some version of processor 1100. However, it should be noted that it is unlikely that integrated graphics logic and integrated memory control units would exist in the processors 1110 and 1115.

FIG. 11 illustrates that the GMCH 1120 may be coupled to a memory 1140 that may be, for example, a dynamic random access memory (DRAM). The DRAM may, for at least one embodiment, be associated with a non-volatile cache.

The GMCH 1120 may be a chipset, or a portion of a chipset. The GMCH 1120 may communicate with the processor(s) 1110, 1115 and control interaction between the processor(s) 1110, 1115 and memory 1140. The GMCH 1120 may also act as an accelerated bus interface between the processor(s) 1110, 1115 and other elements of the system 1100. For at least one embodiment, the GMCH 1120 communicates with the processor(s) 1110, 1115 via a multi-drop bus, such as a frontside bus (FSB) 1195.

Furthermore, GMCH 1120 is coupled to a display 1145 (such as a flat panel display). GMCH 1120 may include an integrated graphics accelerator. GMCH 1120 is further coupled to an input/output (I/O) controller hub (ICH) 1150, which may be used to couple various peripheral devices to system 1100. Shown for example in the embodiment of FIG. 11 is an external graphics device 860, which may be a discrete graphics device coupled to ICH 1150, along with another peripheral device 1170.

Alternatively, additional or different processors may also be present in the system 1100. For example, additional processor(s) 1115 may include additional processors(s) that are the same as processor 1110, additional processor(s) that are heterogeneous or asymmetric to processor 1110, accelerators (such as, e.g., graphics accelerators or digital signal processing (DSP) units), field programmable gate arrays, or any other processor. There can be a variety of differences between the physical resources 1110, 1115 in terms of a spectrum of metrics of merit including architectural, micro-architectural, thermal, power consumption characteristics, and the like. These differences may effectively manifest themselves as asymmetry and heterogeneity amongst the processing elements 1110, 1115. For at least one embodiment, the various processing elements 1110, 1115 may reside in the same die package.

Referring now to FIG. 9, shown is a block diagram of a second system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. As shown in FIG. 12, each of processors 1270 and 1280 may be some version of the processor 101.

Alternatively, one or more of processors 1270, 1280 may be an element other than a processor, such as an accelerator or a field programmable gate array.

While shown with only two processors 1270, 1280, it is to be understood that the scope of the present invention is not so limited. In other embodiments, one or more additional processing elements may be present in a given processor.

Processor 1270 may further include an integrated memory controller hub (IMC) 1272 and point-to-point (P-P) interfaces 1276 and 1278. Similarly, second processor 1280 may include a IMC 1282 and P-P interfaces 1286 and 1288. Processors 1270, 1280 may exchange data via a point-to-point (PtP) interface 1250 using PtP interface circuits 1278, 1288. As shown in FIG. 12, IMC's 1272 and 1282 couple the processors to respective memories, namely a memory 1242 and a memory 1244, which may be portions of main memory locally attached to the respective processors.

Processors 1270, 1280 may each exchange data with a chipset 1290 via individual P-P interfaces 1252, 1254 using point to point interface circuits 1276, 1294, 1286, and 1298. Chipset 1290 may also exchange data with a high-performance graphics circuit 938 via a high-performance graphics interface 1239.

A shared cache (not shown) may be included in either processor outside of both processors, yet connected with the processors via P-P interconnect, such that either or both processors' local cache information may be stored in the shared cache if a processor is placed into a low power mode. Chipset 1290 may be coupled to a first bus 1216 via an interface 1296. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, second bus 1220 may be a low pin count (LPC) bus. Various devices may be coupled to second bus 1220 including, for example, a keyboard/mouse 1222, communication devices 1226 and a data storage unit 1228 such as a disk drive or other mass storage device which may include code 1230, in one embodiment. Further, an audio I/O 1224 may be coupled to second bus 1220. Note that other architectures are possible. For example, instead of the point-to-point architecture of FIG. 12, a system may implement a multi-drop bus or other such architecture.

Referring now to FIG. 13, shown is a block diagram of a third system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processing elements 1270, 1280 may include integrated memory and I/O control logic ("CL") 1272 and 1282, respectively. For at least one embodiment, the CL 1272, 1282 may include memory controller hub logic (IMC). In addition, CL 1272, 1282 may also include I/O control logic. FIG. 10 illustrates that not only are the memories 1242, 1244 coupled to the CL 1272, 1282, but also that I/O devices 1214 are also coupled to the control logic 1272, 1282. Legacy I/O devices 1215 are coupled to the chipset 1290.

Figure 14:
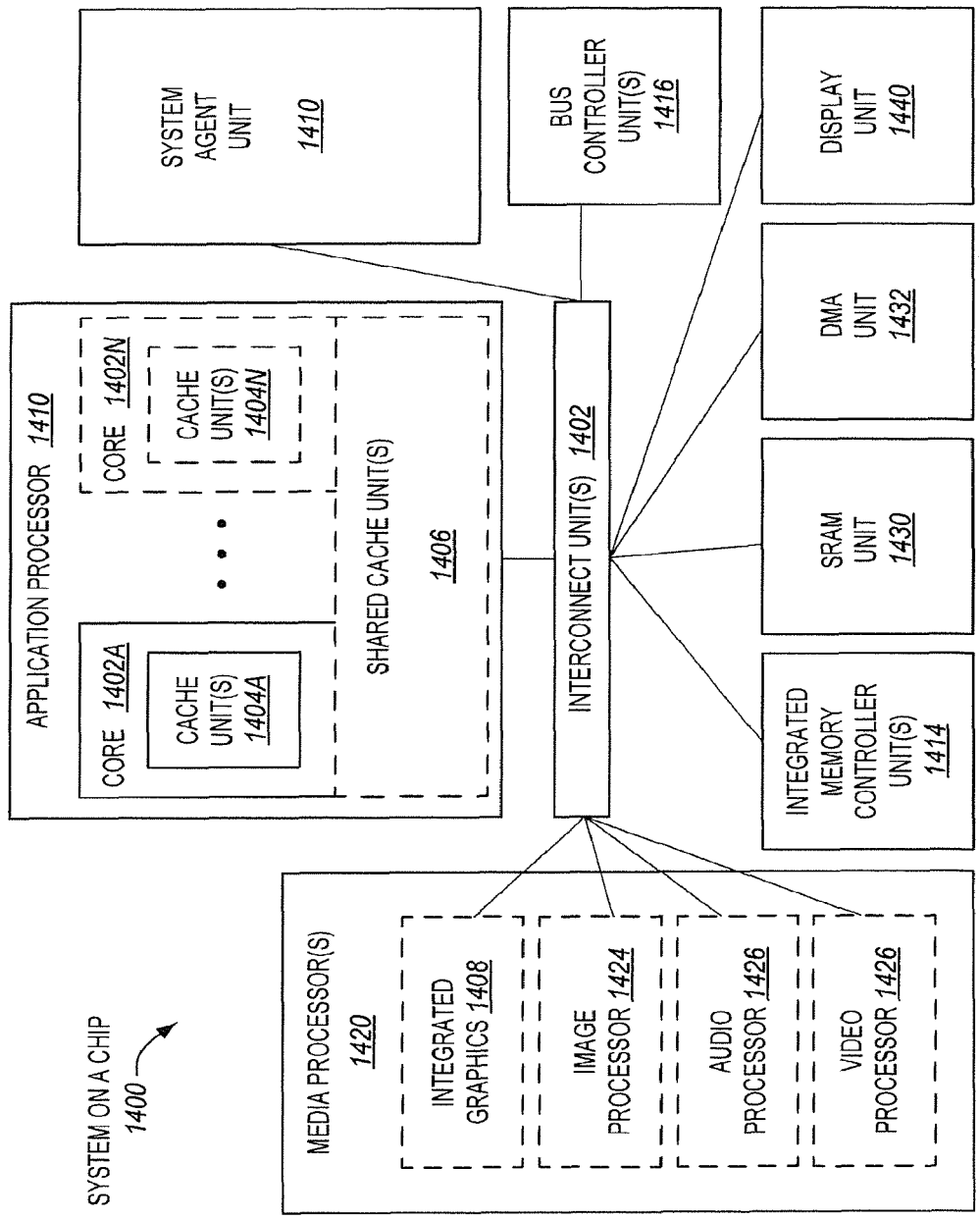
FIG. 14 is a block diagram of a system on chip (SoC) in accordance with an embodiment of the invention.
Figure 15:
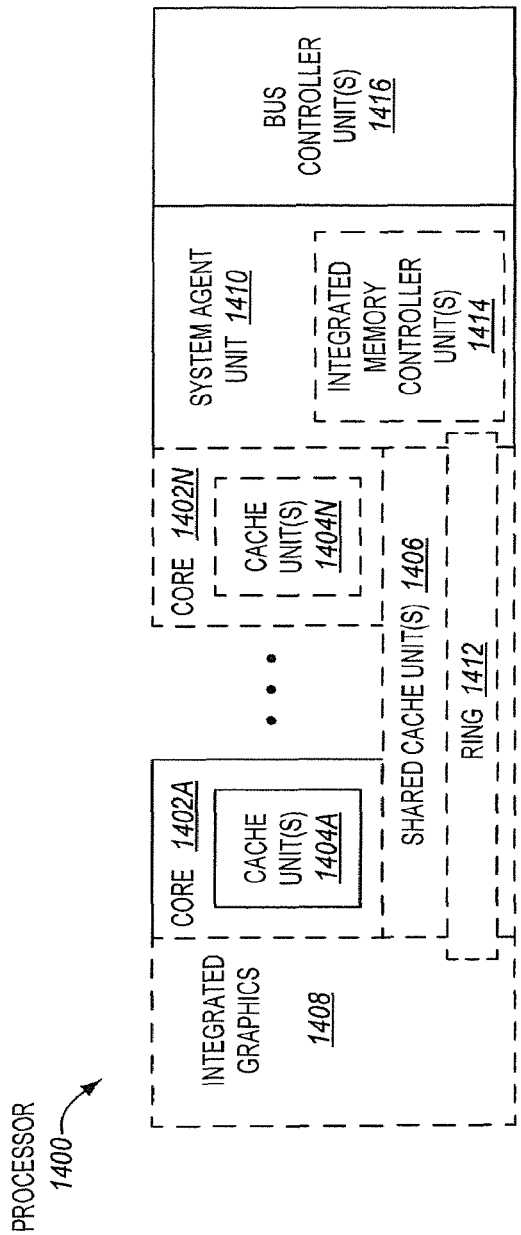
FIG. 15 is a block diagram of a single core processor and a multi-core processor with integrated memory controller and graphics according to embodiments of the invention.

Referring now to FIG. 14, shown is a block diagram of a SoC 1400 in accordance with an embodiment of the present invention. Similar elements in FIG. 15 bear like reference numerals. Also, dashed lined boxes are optional features on more advanced SoCs. In FIG. 14, an interconnect unit(s) 1402 is coupled to: an application processor 1410 which includes a set of one or more cores 1402A-N and shared cache unit(s) 1406; a system agent unit 1410; a bus controller unit(s) 1414; an integrated memory controller unit(s) 1414; a set or one or more media processors 1420 which may include integrated graphics logic 1408, an image processor 1424 for providing still and/or video camera functionality, an audio processor 1426 for providing hardware audio acceleration, and a video processor 1428 for providing video encode/decode acceleration; an static random access memory (SRAM) unit 1430; a direct memory access (DMA) unit 1432; and a display unit 1440 for coupling to one or more external displays.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks (compact disk read-only memories (CD-ROMs), compact disk rewritables (CD-RWs)), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions the vector friendly instruction format or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
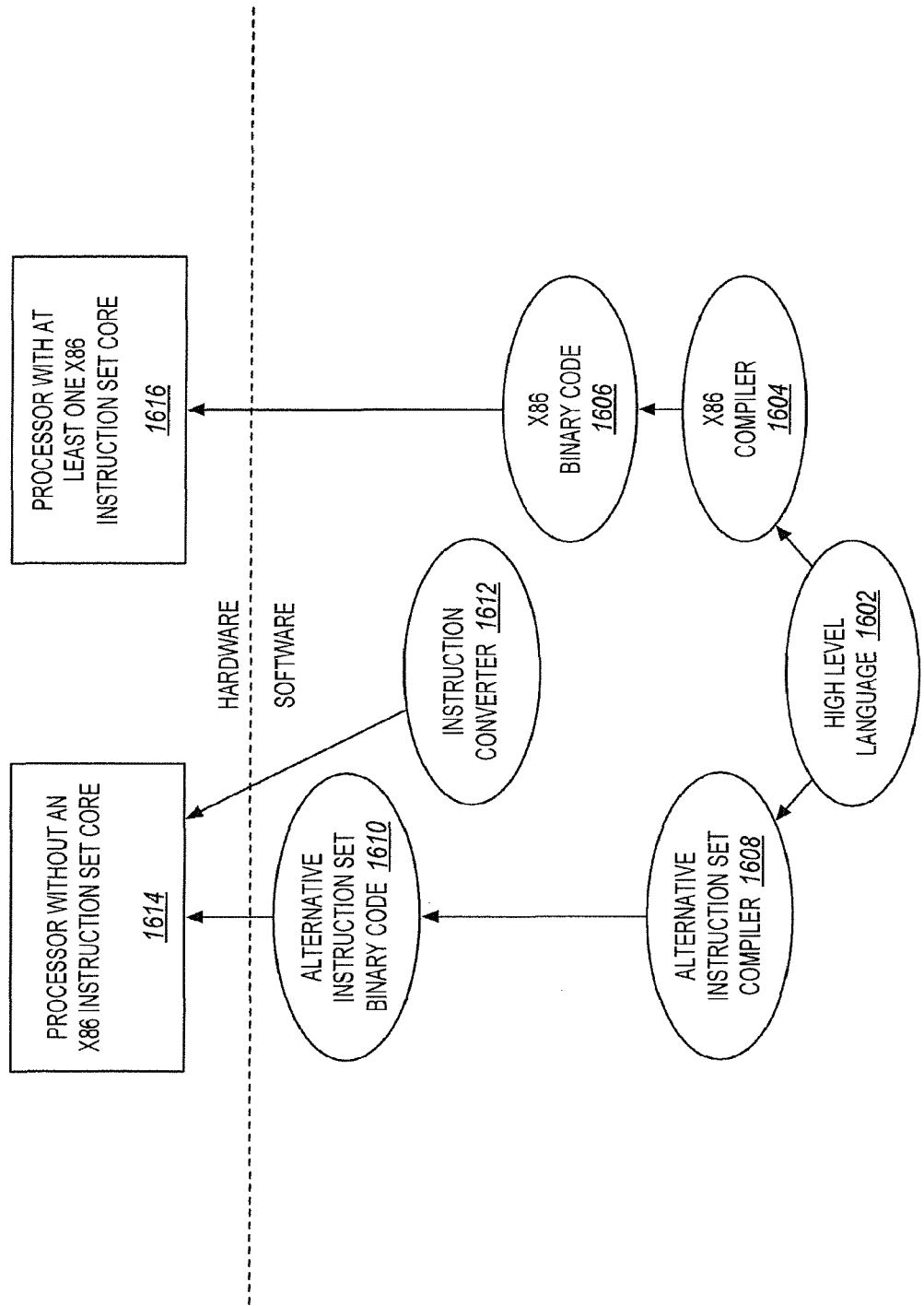
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof.

FIG. 16 shows a program in a high level language 1602 may be compiled using an x86 compiler 1604 to generate x86 binary code 1606 that may be natively executed by a processor with at least one x86 instruction set core 1616 (it is assume that some of the instructions that were compiled are in the vector friendly instruction format). The processor with at least one x86 instruction set core 1816 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1606 (e.g., object code) that can, with or without additional linkage processing, be executed on the processor with at least one x86 instruction set core 1616. Similarly, FIG. 90 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Certain operations of the instruction(s) may be performed by hardware components and may be embodied in machine-executable instructions that are used to cause, or at least result in, a circuit or other hardware component programmed with the instructions performing the operations. The circuit may include a general-purpose or special-purpose processor, or logic circuit, to name just a few examples. The operations may also optionally be performed by a combination of hardware and software. Execution logic and/or a processor may include specific or particular circuitry or other logic responsive to a machine instruction or one or more control signals derived from the machine instruction to store an instruction specified result operand. For example, embodiments of the instruction(s) disclosed herein may be executed in one or more the systems of embodiments of the instruction(s) in the vector friendly instruction format may be stored in program code to be executed in the systems. Additionally, the processing elements of these figures may utilize one of the detailed pipelines and/or architectures (e.g., the in-order and out-of-order architectures) detailed herein. For example, the decode unit of the in-order architecture may decode the instruction(s), pass the decoded instruction to a vector or scalar unit, etc.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents. For example, one or more operations of a method may be combined or further broken apart.

ALTERNATIVE EMBODIMENTS

While embodiments have been described which would natively execute the vector friendly instruction format, alternative embodiments of the invention may execute the vector friendly instruction format through an emulation layer running on a processor that executes a different instruction set (e.g., a processor that executes the MIPS instruction set of MIPS Technologies of Sunnyvale, Calif., a processor that executes the ARM instruction set of ARM Holdings of Sunnyvale, Calif.). Also, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

What is claimed is:

1. A method of performing a JH process in a computer processor, comprising:
    storing JH state bits are stored in a plurality of registers before executing instructions of a first type;
    decoding instructions of the first type and a second type;
    executing one or more instructions of the first type to perform substitution (S-Box) mappings and a linear (L) transformation on a JH state, by
        executing an instruction of a first type a first time to perform the S-Box mappings and the L transformation on a first component of the JH state stored in the first register, and
        executing an instruction of a first type a second time to perform the S-Box mappings and the L transformation on a second component of the JH state stored in the second register; and
    executing one or more instructions of the second type to perform a permutation function on the JH state once the S-Box mappings and the L transformation have been performed, wherein a format of an instruction of the first type includes a first register operand to store half of a JH state and a format of an instruction of the second type includes second and third register operands to hold results of execution of instructions of the first type.

2. The method of claim 1 wherein the plurality of registers are 512-bit registers.

3. The method of claim 2 wherein a register stores a lower 512 bits of the JH state and a different register stores the upper 512 bits of the JH state.

4. The method of claim 1 wherein the instruction of a first type is executed the first time and the second time using a mask register.

5. The method of claim 1 further comprising:
    storing the results of the first execution of the instruction of a first type in a first destination register as first JH state results; and
    storing the results of the second execution of the instruction of a first type in a second destination register as second JH state results.

6. The method of claim 5 wherein execution of the instruction of the second type further comprises:
    retrieving JH state results from the first and second destination registers;
    performing a first permutation function on the first JH state results; and
    performing a second permutation function on the second JH state results.

7. An apparatus comprising:
    a plurality of data registers, wherein the plurality of data registers comprise a register to store a first half of JH state bits and a register to store a second half of the JH state bits; and
    an execution unit coupled with the plurality of the data registers, to execute one or more instructions of a first type to perform S-Box mappings and a linear (L) transformation on a JH state and one or more instructions of a second type to perform a permutation function on the JH state once the S-Box mappings and the L transformation have been performed, wherein a format of an instruction of the first type includes a first register operand to store half of a JH state and a format of an instruction of the second type includes second and third register operands to hold results of execution of instructions of the first type, wherein the execution unit to execute the instructions of the first type a first time to perform the S-Box mappings and the L transformation on the first half of the JH state bits and to execute the instructions of the first type a second time to perform the S-Box mappings and the L transformation on the second half of the JH state bits.

8. The apparatus of claim 7 wherein the registers are 512-bit registers.

9. The apparatus of claim 7 wherein the instruction of a first type is executed the first time and the second time using a mask register.

10. The apparatus of claim 9 wherein the execution unit to store a result of the first execution of the instruction of a first type in a first destination register as first JH state results and store a result of the second execution of the instruction of a first type in a second destination register as second JH state results.

11. The apparatus of claim 10 wherein the execution unit to execute the instruction of the second type by retrieving JH state results from the first and second destination registers, performing a first permutation function on the first JH state results and performing a second permutation function on the second JH state results.

12. An article of manufacture comprising:
    a non-transitory machine-readable storage medium including one or more solid data storage materials, the machine-readable storage medium storing instructions, which when executed causes a processor to:
    store JH state bits are stored in a plurality of registers before executing instructions of a first type;
    decode instructions of the first type and a second type;
    execute one or more instructions of the first type to perform substitution (S-Box) mappings and a linear (L) transformation on a JH state, by
        executing an instruction of a first type a first time to perform the S-Box mappings and the L transformation on a first component of the JH state stored in the first register, and
        executing an instruction of a first type a second time to perform the S-Box mappings and the L transformation on a second component of the JH state stored in the second register; and
    execute one or more instructions of the second type to perform a permutation function on the JH state once the S-Box mappings and the L transformation have been performed, wherein a format of an instruction of the first type includes a first register operand to store half of a JH state and a format of an instruction of the second type includes second and third register operands to hold results of execution of instructions of the first type.

13. The article of manufacture of claim 12 wherein the instruction of a first type is executed the first time and the second time using a mask register.

14. The article of manufacture of claim 12 wherein the machine-readable storage medium stores instructions, which when executed further causes the processor to:
   store the results of the first execution of the instruction of a first type in a first destination register as first JH state results; and
   store the results of the second execution of the instruction of a first type in a second destination register as second JH state results.

15. The article of manufacture of claim 14 wherein the machine-readable storage medium stores instructions, which when executed further causes the processor to:
   retrieve JH state results from the first and second destination registers;
   perform a first permutation function on the first JH state results; and
   perform a second permutation function on the second JH state results.

16. A system comprising:
   an interconnect;
   a processor coupled with the interconnect, the processor including a plurality of data registers, wherein the plurality of data registers comprise a register to store a first half of JH state bits and a register to store a second half of the JH state bits, and the processor to execute one or more instructions of a first type to perform S-Box mappings and a linear (L) transformation on a JH state and one or more instructions of a second type to perform a permutation function on the JH state once the S-Box mappings and the L transformation have been performed, wherein a format of an instruction of the first type includes a first register operand to store half of a JH state and a format of an instruction of the second type includes second and third register operands to hold results of execution of instructions of the first type, wherein the processor to execute the instructions of a first type a first time to perform the S-Box mappings and the L transformation on the first half of the JH state bits and to execute the instructions of a first type a second time to perform the S-Box mappings and the L transformation on the second half of the JH state bits; and
   a dynamic random access memory (DRAM) coupled with the interconnect.

17. The system of claim 16 wherein instruction of a first type is executed the first time and the second time using a mask register.

18. The system of claim 16 wherein the processor to store a result of the first execution of the instruction of a first type in a first destination register as first JH state results and store a result of the second execution of the instruction of a first type in a second destination register as second JH state results.

19. The system of claim 18 wherein the processor to execute the instruction of the second type by retrieving JH state results from the first and second destination registers, performing a first permutation function on the first JH state results and performing a second permutation function on the second JH state results.

* * * * *